Nov. 23, 1948.  S. G. BRADY ET AL  2,454,591
INDEXING MECHANISM
Filed March 5, 1945  3 Sheets-Sheet 1
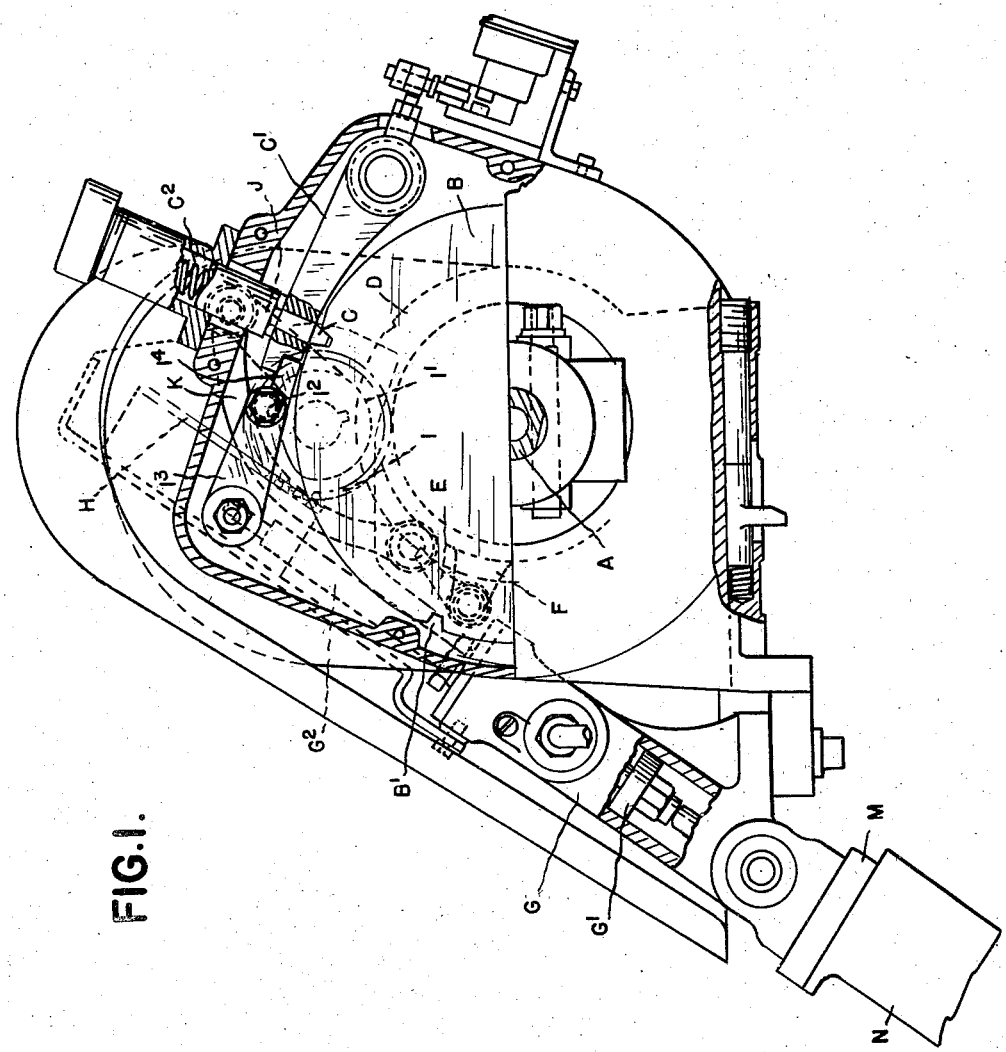
FIG. I.
INVENTORS
SAMUEL G. BRADY
BY JOHN L. KING
*Whittemore Hulbert Belknap*
ATTORNEYS

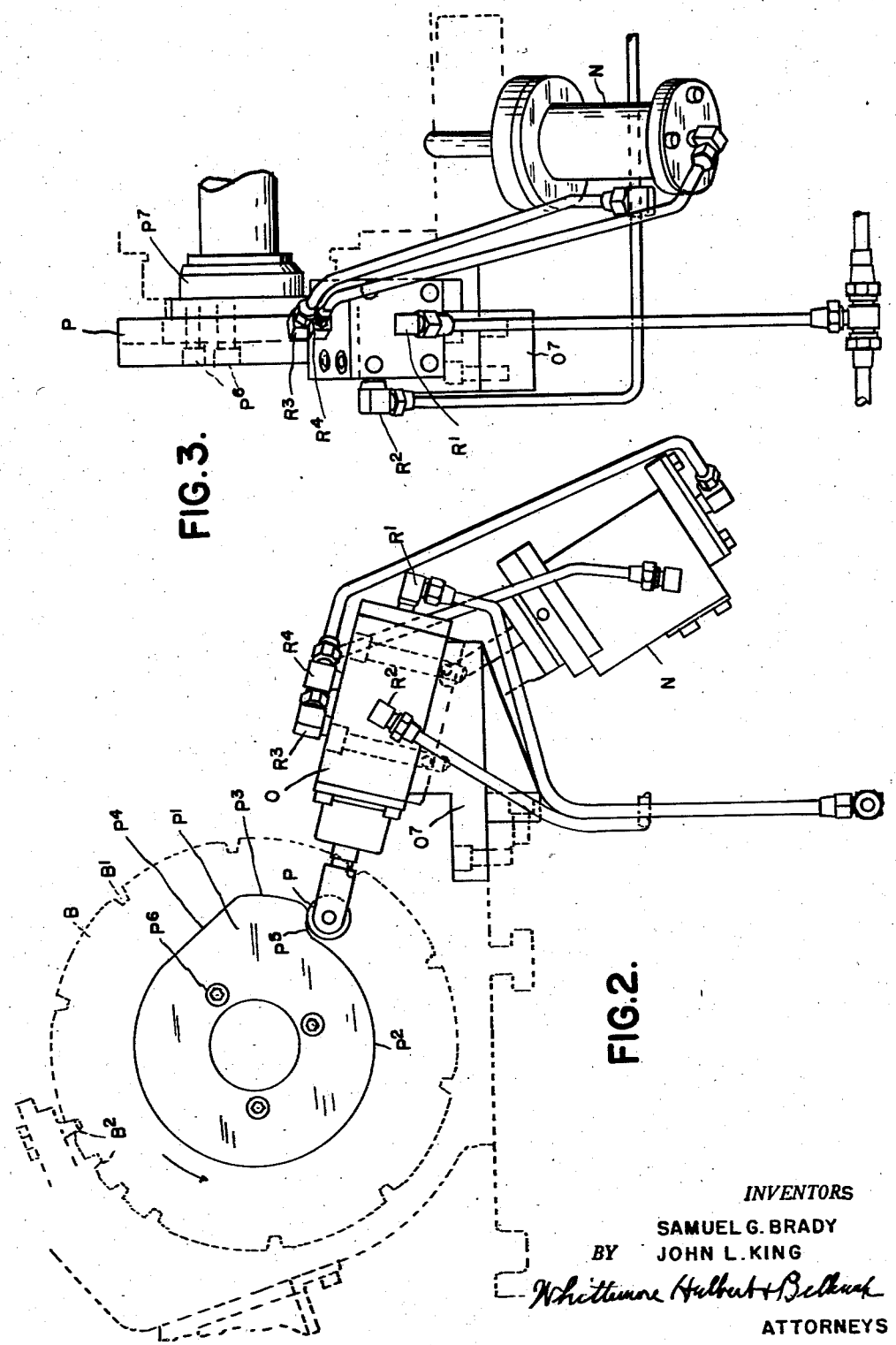

Nov. 23, 1948.  S. G. BRADY ET AL  2,454,591
INDEXING MECHANISM
Filed March 5, 1945  3 Sheets-Sheet 3

INVENTORS
SAMUEL G. BRADY
BY  JOHN L. KING

ATTORNEYS

Patented Nov. 23, 1948

2,454,591

UNITED STATES PATENT OFFICE 2,454,591

INDEXING MECHANISM

Samuel G. Brady and John L. King, Royal Oak, Mich., assignors to The Gear Grinding Machine Company, Hamtramck, Mich., a corporation of Michigan Application March 5, 1945, Serial No. 581,136

4 Claims. (Cl. 90—57)

The invention relates to indexing mechanisms and has for its object the obtaining of a construction in which the intervals between successive index positions may be altered during the same cycle.

It is a further object to automatically accomplish this change and with these objects in view the invention consists in the construction as hereinafter set forth.

In the drawings:

Fig. 1 is an end elevation of an indexing mechanism of the general type to which our improvements are applied;

Fig. 2 is an opposite end elevation showing the means for changing the index intervals;

Fig. 3 is a side elevation thereof;

General construction of the indexing mechanism

Figure 5:
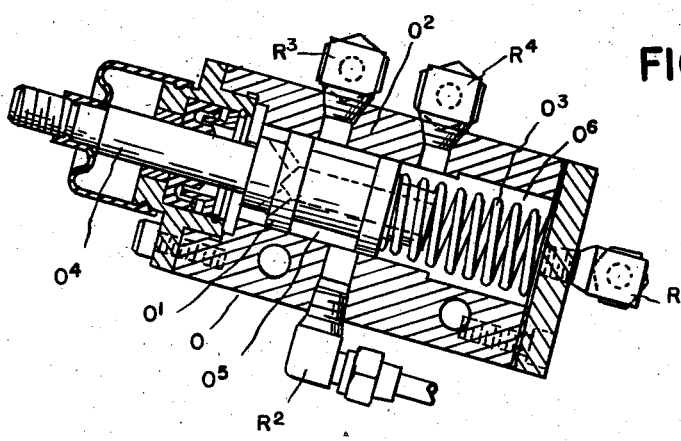
Fig. 5 is a section through the controlling valve for the stop shifting means.
Figure 4:
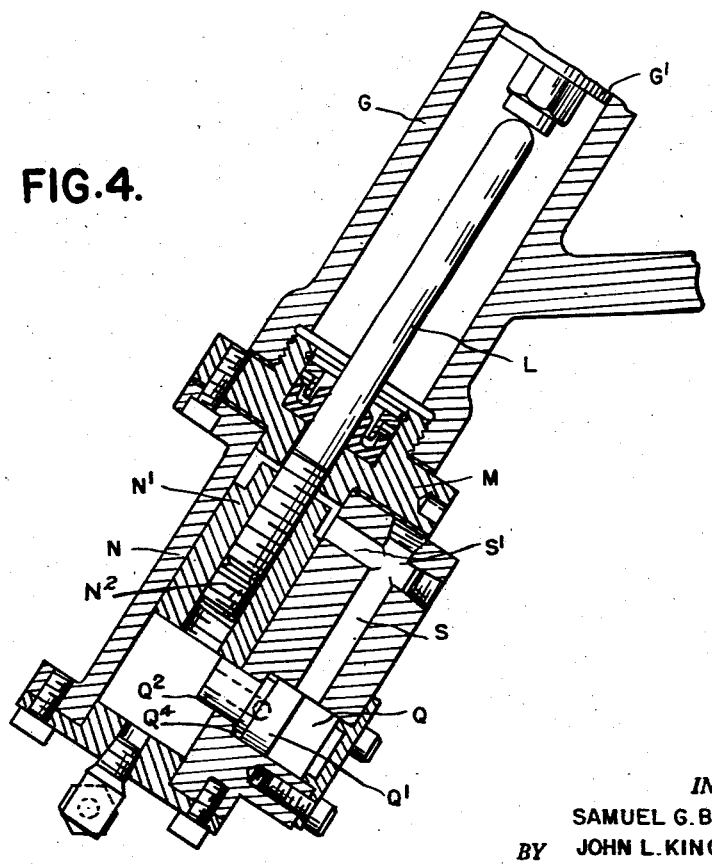
Fig. 4 is a central longitudinal section through the stop shifting means.

The general features of the indexing mechanism illustrated in Fig. 1 are not the subject matter of the instant invention but are of the following construction. A is the rotary spindle to be indexed. B is the index plate mounted on said spindle which is peripherally notched for the different index positions. C is a dog for successively engaging said notches, said dog being mounted on a rock arm C' and being resiliently pressed inward by a spring $C^2$. D is a ratchet wheel secured to the plate B. E is a pawl for engaging said ratchet wheel to rotate the same and the plate B. F is a member carrying the pawl E which is mounted for oscillation about the axis of the spindle A. This member is actuated by a mechanism including a hydraulic cylinder G, a piston G' therein, a piston rod $G^2$, a rack member H connected to said piston rod, a rotary pinion I engaged by said rack member, a rock arm J connected to said pinion and a connecting rod or link K between said rock arm J and said oscillatory member F. The arrangement is such that movement of the piston within the cylinder G will through the rack H rotate the pinion I and the latter through the rock arm J will communicate this movement to the member F, which latter through the pawl E will actuate the ratchet wheel D and index plate B. The amount of angular movement imparted to the latter is dependent upon the length of stroke of the piston G' within the hydraulic cylinder G and this, in turn, is dependent upon the position of an adjustable stop L extending into said cylinder. Thus, by adjusting this stop the angle of movement imparted to the index plate by each stroke of the piston corresponds to the angle between successive notches in said plate. There is also provided means for disengaging the locking dog C in advance of movement of the oscillatory member F which comprises a cam I' secured to the pinion I engaging a roller $I^2$ on a rock arm $I^3$. The latter has a finger $I^4$ engaging the end of the rock arm C' so that when actuated by the cam I' it will disengage the locking dog C from the notch in the index plate B to permit of adjustment of the latter. Such operation is accomplished during the initial portion of the outward movement of the piston G' which also operates the member F in the reverse direction from that for actuating the ratchet wheel D by the pawl E. On the other hand, when the piston G' moves inward, the pawl E engaging said ratchet wheel D will rotate the index plate so that the notch from which the dog C is removed will be out of registration therewith. Thus, the plate can freely rotate until another notch comes into registration with the dog C whereupon the resilient pressure of the spring $C^2$ will force the dog into locking engagement therewith. As above stated, this indexing mechanism is not the subject matter of the instant invention and, therefore, need not be further described in detail.

Stop shifting mechanism

With indexing mechanisms of the type as above described, it is usual to equally space the notches in the periphery of the index plate. However, for certain types of work the angle between successive notches in one part of the cycle differs from that in another. It is, therefore, the object of the instant invention to provide means for automatically changing the length of stroke of the piston G' to correspond to these changes in index intervals which is accomplished as follows. At the outer end of the hydraulic cylinder G there is a head M apertured for the passage of a stop rod L therethrough and on this head is mounted a second hydraulic cylinder N containing a piston N'. This piston is internally threaded to engage corresponding threads on the stop rod L so that the latter may be adjusted to project a greater or lesser distance from the piston. A locking member $N^2$ also engaging the threads of the piston serves to hold the rod L in its adjusted position. When the piston N' is at the inner end of the cylinder N, the stop rod L will be projected the greatest distance into the cylinder and, consequently, will correspondingly restrict the length of stroke of the piston G' in said cylinder. On the other hand, when the piston N' is at the outer end of the cylinder N, the stop rod L will be withdrawn so as to correspondingly increase the length of stroke of the piston G'. The greater length of stroke of the piston G' corresponds to the angular spacing between notches B' in the index plate B and the shorter length of stroke of the piston corresponds to the lesser angular spacing of notches $B^2$ in said plate.

Valve and controlling mechanism

In order that the stop L should be shifted at the proper points in the cycle, the position of the piston N' in the cylinder N is controlled by a valve O. As shown in Fig. 5, the the valve O is of the piston type and the piston O' in the cylinder $O^2$ is urged in one direction by a spring $O^3$. The piston rod $O^4$ extends out from the cylinder and at its outer end has mounted thereon a roller P which is engaged with a cam P' mounted to rotate with the index plate B. The cam P' has concentric portions $P^2$ and $P^3$ of its periphery which are of different lengths of radius. Between these portions there is at one side of the portion $P^3$ an incline portion $P^4$, while on the other side of the portion $P^3$ there is an abrupt drop $P^5$ to the portion $P^2$. The length of the segment $P^3$ corresponds to all but one of the series of notches $B^2$, and the abrupt drop $P^5$ occurs between the next to last and the last of the notches $B^2$, so that when the dog C (Fig. 1) is engaged in the next to last of the notches $B^2$, the roller P (Fig. 2) is on segment $P^3$. However, when dog C is engaged in the last of the notches $B^2$, the roller P is on segment $P^2$, as in position shown in Fig. 2. The length of the segment $P^2$ corresponds to all but one of the series of notches B' and the incline portion $P^4$ is included within the angle between the last of the notches B' and the first of the notches $B^2$. The function of the valve O is to supply pressure fluid to the cylinder N alternatively on opposite sides of the piston N' thereby holding said piston at either one or the other end of said cylinder. This will adjust the stop rod L so as to correspondingly change the length of stroke of the piston G' in the cylinder G. However, as this stop must positively arrest movement of the piston, it is desirable to have equally positive means for holding the piston N' stationary in each of its alternative positions which is accomplished as follows. At one side of the cylinder N there is formed a small transversely extending cylinder Q within which is a piston Q' having a portion $Q^2$ of reduced diameter adapted to extend into the cylinder N adjacent to the outer end of piston N' when at the inner end of its stroke. In such position the portion $Q^2$ will form a positive stop for the piston and the stop rod L so that the impingement of the piston G' against the latter cannot change its position. It is, of course, necessary that the portion $Q^2$ should be withdrawn from the path of the piston N' before the latter is moved to the outer end of the cylinder N which is accomplished in the following manner. Pressure fluid is supplied to the valve O through a conduit $R^2$ and, in the position of said valve shown in Fig. 5, this pressure fluid enters the annular space $O^5$ between heads at opposite ends of valve piston O', from which it passes through a conduit $R^3$ to the cylindrical chamber Q in the cylinder N. Assuming that the piston Q' is at the inner end of said chamber Q, the pressure fluid in said chamber is free to enter an annular space $Q^4$ causing piston Q' to move outward, said outward movement uncovers and permits the pressure fluid to pass through a channel S and cross channel S' to the inner end of the cylinder N. Thus, the pressure of the fluid will hold the piston N' against the outer end of said cylinder which will withdraw the stop L from the cylinder G to permit the long stroke of the piston G' in said cylinder. An exhaust conduit R' is connected with the cylinder O so that in the position of the valve shown in Fig. 5 it communicates with a chamber $O^6$ in the outer end of cylinder $O^2$. A conduit $R^4$ connected to the valve cylinder $O^2$ also communicates with the space $O^6$ in the position of the valve shown in Fig. 5 and this conduit $R^4$ extends to the outer end of the cylinder N. It will be apparent from the above that the stop L will be held in the position which is described as long as the valve piston O' is in the position shown in Fig. 5, which occurs when the roller P is opposite the segment $P^2$ of the cam P' as shown in Fig. 2. However, when the index plate B is moved between the next to the last, to the last of the series of notches B', the portion $P^4$ of the cam operating against the roller P will move the piston O outward so that said roller engages the segment $P^3$ of the cam. Such movement will shift the valve O' so that the pressure fluid will pass into the conduit $R^4$ while the conduit $R^3$ will be connected with the exhaust. The fluid from the conduit $R^4$ entering the outer end of the cylinder N will move the piston N' inward until it reaches the opposite end of said cylinder. During this movement the piston N will pass the opening in the cylinder wall which contains the piston Q'. This piston has a passage $Q^3$ extending axially therethrough so that as soon as it is uncovered pressure fluid will pass through said passage to the outer end of the piston Q' moving it inward and projecting the portion $Q^2$ thereof into the cylinder end. This portion $Q^2$ will thus form a positive stop for holding the piston N' and stop rod L from displacement by the impact of the piston G'. Consequently, the length of stroke of the piston G' will be reduced to that required for moving the index plate between successive notches $B^2$.

The stop shifting mechanism above described forms a complete unit which may be attached to index mechanisms designed for use with uniformly spaced index positions. In such mechanisms the stop rod L will be threaded into the head of the cylinder G so that it may be adjusted to obtain just the required length of stroke of the piston. All that is necessary to convert this to the shifting stop construction is to, first, remove the head of the cylinder G and replace it by the head M which carries the cylinder N and associated parts; second, connect the cam B' with the spindle of the indexing mechanism; third, mount the valve O in the position shown and to connect the conduits thereto and to the cylinder N.

As specifically shown, the cam P' is secured by bolts $P^6$ to a head $P^7$ on the spindle A and the valve O is secured by a bracket $O^7$ to the bed of the machine on which the indexing mechanism is mounted.

What we claim as our invention is:

1. In an indexing mechanism provided with a hydraulic motor for actuating the same between successive positions in a cycle and a stop for limiting the length of each actuating movement of said motor, a hydraulic motor for moving said stop alternately from one to another of two positions, a valve controlling said last mentioned hydraulic motor and means automatically operated at a predetermined point in said cycle for actuating said valve thereby quickly shifting said stop to change the length of said actuating movement.

2. In an indexing mechanism provided with a hydraulic cylinder and piston motor for actuating the same between successive positions in a cycle, a second cylinder connected to and in alignment with said first mentioned cylinder, a piston in said second cylinder, a stop rod adjustably secured to the piston of said second cylinder and extending into the first cylinder to limit the length of movement of the piston therein, a valve controlling the hydraulic fluid for said second cylinder adapted to move the piston therein from one position to another, and a cam operating at a predetermined point in the cycle of said mechanism for actuating said valve.

3. In an indexing mechanism provided with a hydraulic cylinder and piston motor for actuating the same between successive positions in the cycle and a stop for limiting the length of movement of the piston in said cylinder, a second cylinder secured to and in alignment with said first mentioned cylinder, a piston in said second cylinder to which said stop is connected and by which it is shifted when said piston moves from one end to the other of said second cylinder, a valve for controlling the hydraulic fluid for said second cylinder, a detent operated by the fluid from said valve subsequent to the movement of the piston to the inner end of said second cylinder and adapted to lock the piston in such position from movement by impact against said stop of the piston in said first cylinder, said valve also controlling the release of said detent prior to the movement of the piston to the outer end of said second cylinder, and a cam operating at predetermined points in the cycle of said mechanism for shifting said valve.

4. In an indexing mechanism provided with a hydraulic cylinder and piston motor for actuating the same between successive positions in a cycle, a unit for automatically changing the length of movement of said piston in said cylinder at predetermined points in said cycle comprising a second cylinder secured to and in alignment with said first mentioned cylinder, a piston in said second cylinder, a rod longitudinally adjustably engaging said piston and extending therefrom into said first cylinder to form a stop for the piston therein, a valve controlling the hydraulic fluid for said second cylinder adapted to move the piston therein from one end to the other, a detent located in a transversely extending recess in the wall of said second cylinder adapted when projected from said recess to lock the piston at the inner end of said second cylinder, means controlled by said valve for projecting and retracting said detent respectively subsequent to the movement of the piston to the inner end of said second cylinder and in advance of movement to the outer end, and a cam operating at predetermined points in the cycle of said mechanism for shifting said valve.

SAMUEL G. BRADY.
JOHN L. KING.

REFERENCES CITED

The following references are of record in the file of this patent:

UNITED STATES PATENTS

| Number | Name | Date |
|---|---|---|
| 2,068,084 | Stahlhammer | Jan. 19, 1937 |
| 2,078,698 | Svenson | Apr. 27, 1937 |
| 2,148,348 | Greene et al. | Feb. 21, 1939 |
| 2,203,608 | Wood | June 4, 1940 |
| 2,358,225 | Gotberg | Sept. 12, 1944 |